UNITED STATES PATENT OFFICE.

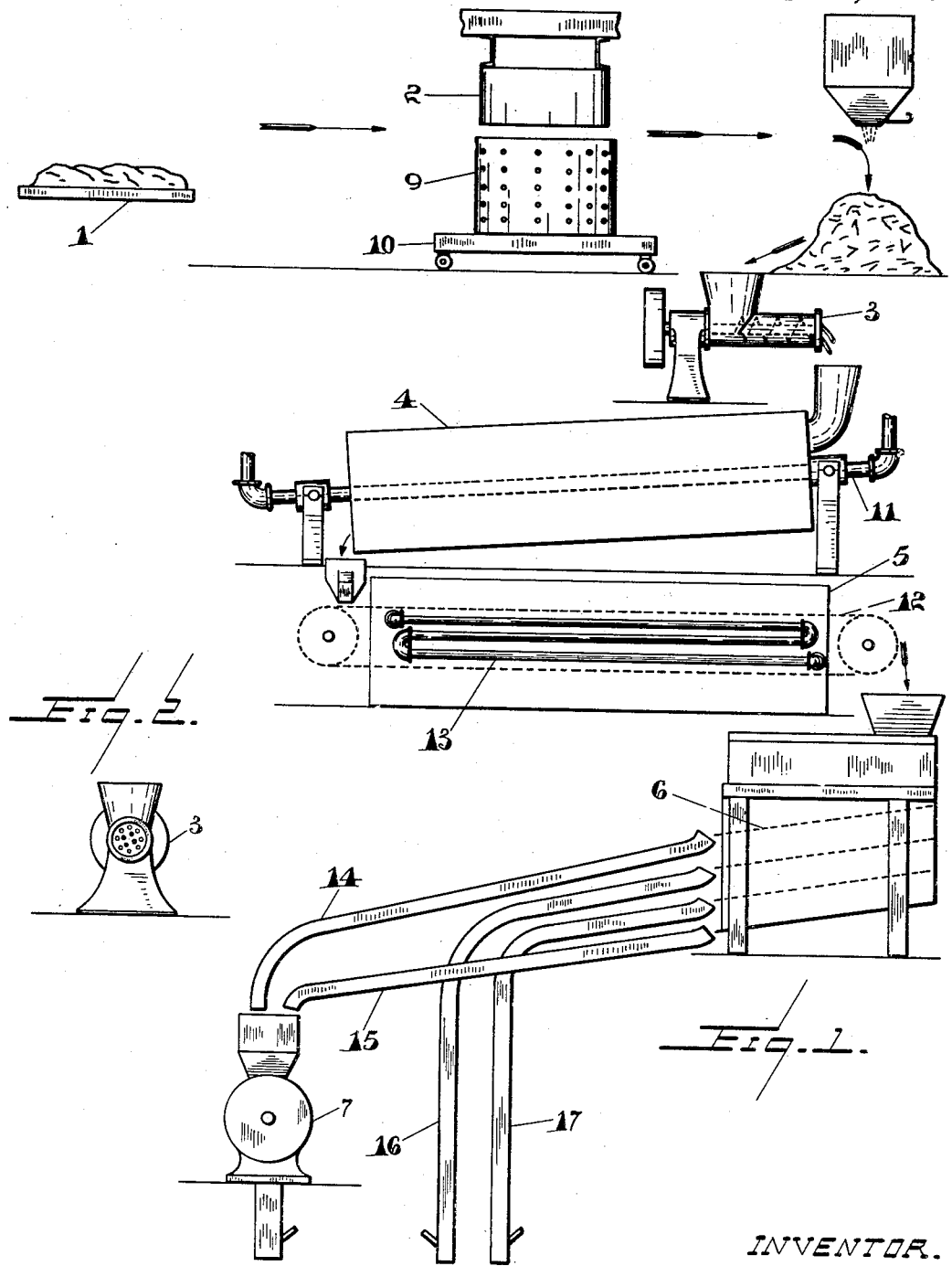

RICHARD L. D. TAYLOR, OF TORONTO, ONTARIO, CANADA, ASSIGNOR TO PREDIGEST FOOD COMPANY, LIMITED, OF TORONTO, ONTARIO, CANADA.

MANUFACTURE OF ANIMAL FOODS FROM KITCHEN WASTE AND THE LIKE.

1,354,068.  Specification of Letters Patent.  Patented Sept. 28, 1920.

Application filed February 25, 1919. Serial No. 279,111.

*To all whom it may concern:*

Be it known that I, RICHARD L. D. TAYLOR, a subject of the King of Great Britain, and resident of the city of Toronto, in the county of York, Province of Ontario, Canada, have invented certain new and useful Improvements in the Manufacture of Animal Foods from Kitchen Waste and the like, of which the following is a specification.

This invention relates to the utilization of what is commonly known as garbage, being the waste animal and vegetable food products from kitchens, bakeries and the like. The waste collected from suitable sources forms substantially a balanced ration for poultry and dogs, but so far it has been found difficult to economically treat the waste so as to obtain a product which will keep well and which is in the form which best adapts it for use as a scratch food for poultry as well as for use in the production of a dry mash or dog biscuit. Heretofore, desiccated and cooked garbage products have been generally produced in a finely granular or pulverulent condition or as a mixture of discrete fragments of the different materials of which the garbage was composed, whereas there is a great demand for a product which may be used in a scratch food. Such a product should be in the form of firm, cohering nodules, preferably about $\frac{1}{8}''$ to $\frac{3}{16}''$ in diameter and each grain should contain substantially all the constituents of the garbage in substantially the same proportions.

The aim of the present invention is to produce a product which will be as largely as possible in such a granular form, the balance being either in a finely granular form or in pieces easily crushed or ground to a finely granular form.

I attain my object by treating the garbage substantially as hereinafter described and by means of apparatus such as diagrammatically represented in the accompanying drawings in which Figure 1 is a view showing diagrammatically the general arrangement of the apparatus and the course of the garbage through the same; and Fig. 2 an end view of the pulping machine.

In the drawings like numerals of reference indicate corresponding parts in the different figures.

The various mechanisms required in carrying out my process are the following, a sorting table 1, a filter press 2 or its equivalent, a pulping machine 3, a rotary drier 4, a belt drier 5, a screening device 6, and a grinder 7. For convenience I may also employ a hopper bin 8 holding the pulverulent vegetable filler which is mixed with the garbage.

The garbage, on receipt at the factory, is thrown on to a sorting table and all materials which would be harmful in the finished product or detrimental to the machinery are sorted out, including also the bones, which require to be separately ground, and, if desired, mixed with the garbage at any stage in the process before drying.

From the sorting table, the garbage passes to suitable means for mechanically expelling surplus moisture, such, for example, as the filter press shown. The box 9 of the press is preferably mounted on a wheel truck 10 for convenience in moving it to the filling position, to the pressing position, and to the emptying position. This filter press removed the larger part of the moisture which is not contained in the cell tissues of the garbage.

After the garbage has been pressed, I mix with it a suitable quantity of a pulverulent absorbent vegetable filler, such, for example, as the well known mill feeds, which include shorts, middlings, and the like. At present I am employing 10% of ground oatmeal hulls and the dust from rolled oat mills. This step in the process is very important as not only is the food produced suitably modified as to its food value, but also owing partly to the absorption of extraneous moisture by the filler, the garbage is brought into such a condition that it can be satisfactorily pulped by the pulping machine 3.

This pulping machine is a grinder of the well known Enterprise type. This machine very thoroughly mixes the garbage and reduces it to the condition of a pasty pulp, which issues from the machine in pulpy strings, in which condition I find that the pulp is most readily broken up and formed into nodules in the next step in the process.

The discharge from the pulping machine is led directly into the rotary drier 4, which may be of any known type which will tumble the pulp while subjecting it to the influence of a high temperature. Preferably steam heat is employed, steam being led through the pipes 11 passing through the trunnions of the drier. Steam pressure of 140 lbs. I have found to be desirable. I have also found that I obtain good results if the length and size of the rotary drying mechanism be such that the pulp mixture passes through it in about twenty minutes emerging in a substantially dry and partly cooked and sterilized condition.

The result of the drying and tumbling is that a large proportion of the pulp is nodulized, that is to say, it is formed in grains which contain substantially all the constituents of the garbage in substantially the same proportions. The nodules formed are of various sizes, but as it is particularly desired to obtain as much of the product as possible in nodules of from $\frac{1}{8}''$ to $\frac{3}{16}''$ in diameter, the final drying and cooking of the product is not carried out in a rotary drier but in an oven through which the product is carried practically without agitation. For this purpose I employ the belt drier 5, the material being carried on the belt 12 through the length of the oven, which is heated by steam carried through coils 13. In the oven a temperature of about 400° is maintained, and the belt is preferably so speeded as to carry the material through in about eight or ten minutes. In this oven the material is completely dried and thoroughly cooked and sterilized.

From the belt drier the material passes to the screening device 6, which separates the nodulized material. That portion of the product which is over $\frac{5}{16}''$ in diameter as well as that which is less than $\frac{1}{8}''$ diameter is led through spouts 14 and 15 to the grinder 7, which may be of the Robinson type. The nodules of the proper size for scratch feed are led through the spouts 16 and 17 to any suitable receptacle. The nodulized product discharged through these spouts 16 and 17 is available for use as poultry scratch food, while the ground product may be used for dry mash, or in the manufacture of dog biscuits or stock foods.

What I claim as my invention is:—

1. A process of treating garbage which consists in pulping the material, and then drying the pulp at a temperature over 300° Fahr., at the same time tumbling the pulped material to cause the formation of nodules.

2. A process of treating garbage which consists in pulping the material; then drying and tumbling the pulped material to cause the formation of nodules; and finally cooking the product of the previous step in the process without agitation to avoid breaking up the nodules.

3. A process of treating garbage which consists in pulping the material; then drying and tumbling the pulped material to cause the formation of nodules; cooking the product of the previous step in the process without agitation to avoid breaking up the nodules; and screening the dried and cooked product to separate the nodules from the coarser and finer parts.

4. A process of treating garbage which consists in mixing with the same a pulverulent absorbent vegetable filler; pulping the partly dried mixture; and then drying the pulp at a temperature over 300° Fahr., at the same time tumbling the pulped material to cause the formation of nodules.

5. A process of treating garbage which consists in mixing with the same a pulverulent absorbent vegetable filler; pulping the partly dried mixture; then drying and tumbling the pulped material to cause the formation of nodules; and finally cooking the product of the previous step in the process without agitation to avoid breaking up the nodules.

6. A dried and cooked garbage product in the form of firm, cohering nodules each nodule containing substantially all the ingredients of the garbage as the other nodules and in substantially the same proportions.

Signed at Toronto, Canada, this 21st day of February 1919.

RICHARD L. D. TAYLOR.